United States Patent [19]
Bisdikian et al.

[11] Patent Number: 6,047,317
[45] Date of Patent: *Apr. 4, 2000

[54] SYSTEM AND METHOD FOR ENABLING A USER TO RAPIDLY ACCESS IMAGES IN CYCLICALLY TRANSMITTED IMAGE STREAMS

[75] Inventors: Chatschik Bisdikian, Mount Kisco, N.Y.; Richard Chernock, Newtown, Conn.; Milan Milenkovic, Boca Raton; Antonio Ruiz, Weston, both of Fla.; Frank Schaffa, Hartsdale, N.Y.

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/825,325

[22] Filed: Mar. 28, 1997

[51] Int. Cl.⁷ ........................................ H04N 7/14
[52] U.S. Cl. .............................. 709/217; 345/327; 348/6; 348/12; 348/10
[58] Field of Search .................... 348/7, 12, 568, 348/13; 455/6.2, 6.3, 5.1; 370/458, 406, 486, 487, 395, 468, 465, 522; 395/200.47

[56] References Cited

U.S. PATENT DOCUMENTS

| | | |
|---|---|---|
| 4,374,399 | 2/1983 | Ensinger . |
| 4,449,249 | 5/1984 | Price . |
| 4,517,598 | 5/1985 | Van Valkenburg et al. . |
| 4,965,825 | 10/1990 | Harvey et al. . |
| 5,109,414 | 4/1992 | Harvey et al. . |
| 5,200,823 | 4/1993 | Yoneda et al. ........................... 348/473 |
| 5,233,654 | 8/1993 | Harvey et al. . |
| 5,335,277 | 8/1994 | Harvey et al. . |
| 5,479,266 | 12/1995 | Young et al. . |
| 5,521,631 | 5/1996 | Budow et al. . |
| 5,570,126 | 10/1996 | Blahut et al. .............................. 455/4.2 |
| 5,600,378 | 2/1997 | Wasilewski .............................. 348/468 |
| 5,602,582 | 2/1997 | Wandersheld et al. ................... 348/12 |
| 5,614,940 | 3/1997 | Cobbely et al. ............................. 348/7 |
| 5,699,106 | 12/1997 | Matsubara et al. ....................... 348/13 |
| 5,701,582 | 12/1997 | DeBey ..................................... 455/5.1 |
| 5,710,970 | 1/1998 | Walters et al. ........................... 455/3.1 |
| 5,751,336 | 5/1998 | Aggarwal et al. ........................ 455/4.2 |
| 5,768,269 | 6/1998 | Rakib et al. ............................. 370/342 |
| 5,774,664 | 6/1998 | Hidary et al. ....................... 395/200.48 |
| 5,774,666 | 6/1998 | Portuesi ............................. 395/200.48 |
| 5,847,750 | 12/1998 | Srivastava et al. ......................... 348/7 |
| 5,850,218 | 12/1998 | LaJoie et al. ............................ 345/327 |

*Primary Examiner*—John W. Miller
*Assistant Examiner*—Reuben M. Brown
*Attorney, Agent, or Firm*—Ohlandt, Greeley, Ruggiero & Perle

[57] ABSTRACT

A video presentation system receives a plurality of series of digital data segments (e.g., image frames) that are cyclically transmitted, wherein certain of the digital data segments manifest a higher priority and are present in the form of plural, time-spaced copies during a series of the digital data segments. The system includes an interface for receiving the repetitively transmitted series of digital data segments and a switch for selecting at least one of the received series of digital data segments. A display presents an image that is constructed from a digital data segment that is selected by a user. By providing plural copies of higher priority digital data segments in each series, a reduction in image access time results when the user selects one of the higher priority digital data segments. A set-top box which serves as the receiver can also be provided with sufficient memory to buffer a certain number of the higher priority digital data segments.

18 Claims, 3 Drawing Sheets

- SAME PAGE (HIGH PRIORITY)
- OTHER INFORMATION PAGES

NAVIGATION DATA TABLE
- No. OF HOT SPOTS
- COORDINATES AND SIZE FOR EACH HOT SPOT
- HYPERLINKS FOR HOT SPOTS
- FRAME PRIORITY VALUE

//SYSTEM AND METHOD FOR ENABLING A USER TO RAPIDLY ACCESS IMAGES IN CYCLICALLY TRANSMITTED IMAGE STREAMS

This Application is related to U.S. patent application Ser. No. 08/825,326, filed on even date herewith and entitled "System and Method for Enabling a User to Move Between Cyclically Transmitted Image Streams".

FIELD OF THE INVENTION

This invention relates to systems for supplying digitally configured video images to multiple users and, more particularly, to a system and method for enabling a user to rapidly access high priority video data in a cyclically transmitted video image stream.

BACKGROUND OF THE INVENTION

Instead of a "leap" occurring from analog video broadcasting to interactive digital television, it has become apparent that the video broadcasting industry is moving in a more gradual fashion. Traditional analog video broadcast services are being first supplemented by digital video broadcast services, then by interactive data services and eventually, by fully interactive multi-media services. Each step in this evolution is being driven by an implementation of a service from which revenue can be generated. For instance, near video-on-demand is now available from digital video servers and enables customers to access concurrently available video presentations.

In present approaches, each of the new digital video services requires reverse channel communication with a head-end or other source of the video broadcast/data.

The growth of Internet services to the home has also fueled interest in interactive services. Digital data broadcasting provides a look and feel of an interactive service on a digital video broadcast platform. Such digital data broadcasting employs a set-top box and the home television receiver to enable a viewing of video images that are sent in MPEG-2 format.

MPEG-2 is a standard established by the Moving Picture Experts Group for digital compression/decompression of motion video and audio. Since up to 10 channels of compressed digital video data can be transmitted over a single six mHz T.V. channel in the United States and eight mHz in Europe, substantially greater utilization of available transmission spectrum is achieved. The MPEG-2 standard also supports digital video transport and covers multiple resolutions, bit rates and delivery mechanisms. When video still frames are sent over a digital video broadcast system, the MPEG-2 standard enables each video still frame to be compressed to an "I" frame which is received and decompressed by the hardware of the set-top box.

Direct digital data broadcasting has been designed to be an incremental service to be added to existing digital video broadcast services. As long as the set-top box in use in a currently available digital video broadcasting system offers necessary firmware and hardware support, modifications to a digital video broadcast system to implement new services are only required at the head-end. Thus, the presently available digital data broadcast system is able to provide a platform for interactive services, without requiring substantial upgrades to user end equipment.

The prior art includes a number of teachings of the provision of multi-media/video services over standard T.V. channels. U.S. Pat. No. 5,521,631 to Budow et al. describes an interactive video services system which provides store and forward distribution of digitized video programming. Encoded and compressed digital video signals are transmitted via a satellite link from a centrally located front end to a plurality of establishments. There, the transmitted digital video programming is stored in a video server computer or is transmitted on a real time basis to customers. The system employs operating system updates, digitized menus and advertising graphics and transmits them over the satellite link to the customer servers.

PCT international application WO 96/17396 to Laursen et al. describes a system for providing multi-media data over a network. The system includes distributed client-server computing facilities and a communication network which is asymmetric. More specifically, a reverse direction communication link is much more limited in bandwidth than the forward direction communication link. The system allows applications to be split, such that set-top boxes focus on presentation, while head-end services run in a distributed server complex and provide access to data via messages across a communication interface.

In the European common market, a system known as "Teletext" is provided over video channels and involves a repetitive, cyclic transmission of text data frames. When a user enters an identifier for a selected frame, the television receiver responds to the selection by awaiting the receipt of the selected frame and causing its display on an associated video television set. Another system, i.e., "Pointcast", permits a user to configure information from the Internet for display on a personal computer. Pointcast catalogs information, constructs a profile for the user and then goes to an Internet-attached server to ask for new information in accordance with the profile. The information is updated periodically.

From the above, it can be seen that there are a number of prior art interactive systems which enable the transfer of digital data via the existing digital data broadcasting network to a customer's television set. In general, such services are either fully interactive, requiring the provision of a reverse communication channel between the customer and the head end or, provide a single channel of selectable video data in accordance with an index or other programming guide which is displayed for user review.

It is an object of this invention to employ an existing digital data broadcasting platform to provide video image information to the user and to enable user interaction therewith, without requiring a reverse communication channel to the broadcasting head end.

It is a further object of this invention to utilize a digital data broadcasting system to broadcast multiple channels of cyclically presented video images and to enable rapid user-access to high priority images in the video images.

SUMMARY OF THE INVENTION

A video presentation system receives a plurality of series of digital data segments (e.g., image frames) that are cyclically transmitted, wherein certain of the digital data segments manifest a higher priority and are present in the form of plural, time-spaced copies during a series of the digital data segments. The system includes an interface for receiving the repetitively transmitted series of digital data segments and a switch for selecting at least one of the received series of digital data segments. A display presents an image that is constructed from a digital data segment that is selected by a user. By providing plural copies of higher priority digital data segments in each series, a reduction in image access time results when the user selects one of the higher priority digital data segments. A set-top box which serves as the receiver can also be provided with sufficient memory to buffer a certain number of the higher priority digital data segments or, alternatively, to buffer the most likely next screens based on a use forecast.

DETAILED DESCRIPTION OF THE INVENTION

Figure 1:
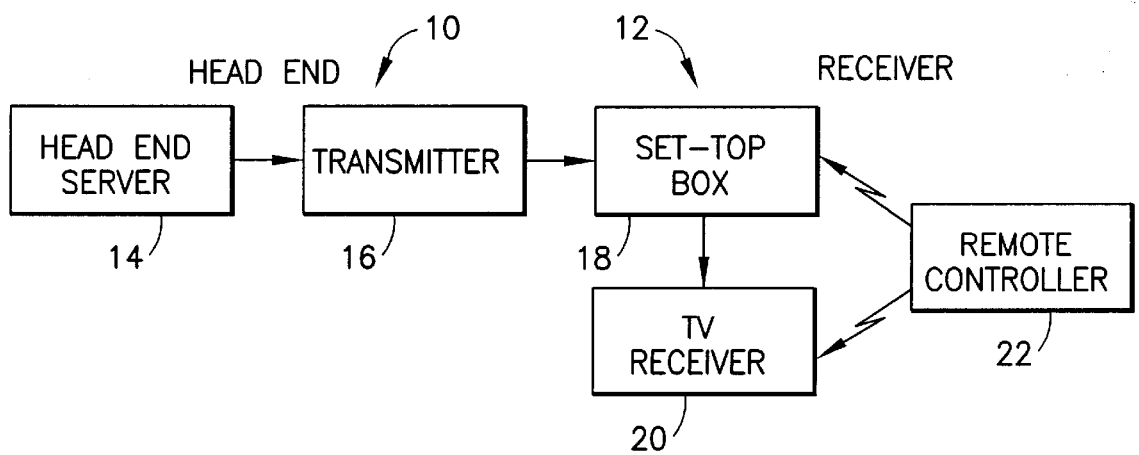
FIG. 1 is a high level block diagram of a system incorporating the invention.

Referring to FIG. 1, a video presentation system includes a head end 10 and one or more receiver facilities 12. Head end 10 includes a head end server 14 and a transmitter 16. Each receiver facility 12 includes a set-top box 18 that is coupled to a television receiver 20, with both being controllable by a remote control unit 22 that is user-operated.

Head end server 14 includes a computer which outputs a plurality of series of image frames, each series being repetitively and cyclically repeated. Each image frame is a "data segment" which is comprised of an image data portion which, when displayed, shows a still frame image, and a navigation data portion whose contents will be described in further detail below.

Figure 2:
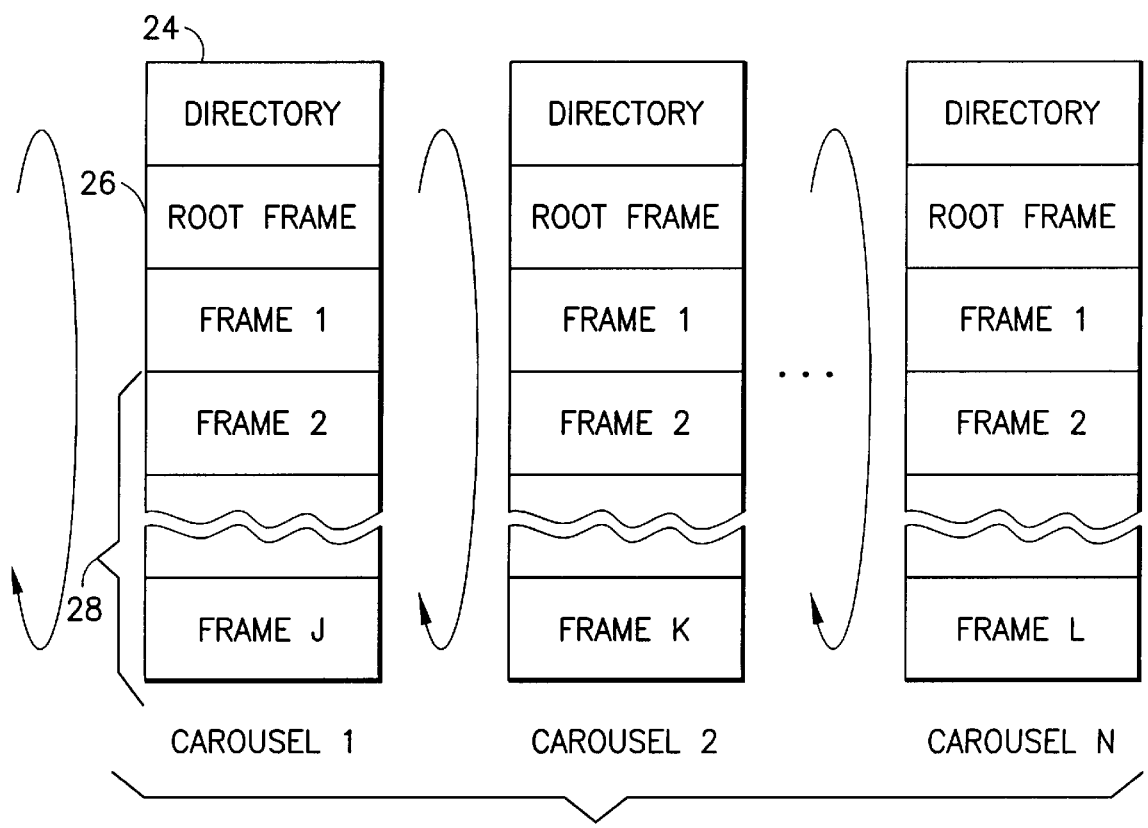
FIG. 2 is a schematic representation of a plurality of repetitively transmitted series of digital data segments that are prepared at the head end server shown in FIG. 1.

In FIG. 2, each one of the illustrated series of image frames is referred to as a "carousel", as each series of image frames is repetitively transmitted on a cyclic basis. Thus, carousel 1, which comprises a directory 24, a root image frame 26 and a plurality of succeeding image frames 28, is repetitively transmitted by transmitter 16 to receiver facility 12. In similar manner, carousels 2, 3, . . . N are also transmitted on a cyclic and concurrent basis.

It is preferred that each of carousels 1–N be output from transmitter 16 in a packet-multiplexed signal stream so that individual frames of carousels 1–N are interleaved in the signal stream.

Figure 2A:
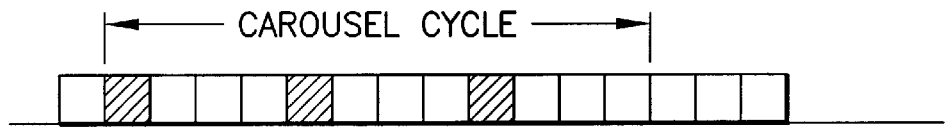
FIG. 2a is a schematic representation of a repetitively transmitted series of digital data segments which includes plural copies of higher priority digital data segments.

Each carousel comprises a directory 24 which notes an identity of each image frame (which later appears in the carousel) and its position in the carousel. A root image frame 26 is the initial frame to be displayed from a carousel when a particular carousel is initially shown to a user. Since there is a time duration required for all image frames in a carousel to be cycled, a user, upon selection of an image frame will, on the average, be required to wait one half of a cycle time before the image frame will be accessible. To reduce the waiting time for certain image frames that are more often accessed, e.g., directory frames, a plurality of copies of such an image frame are positioned in a carousel so as to reduce the user's waiting time. Such positioning is accomplished by assigning a priority value to each image frame or to just high usage image frames and, at the transmitter, inserting plural copies of the higher priority value image frame(s) into a carousel. A schematic picture of such a carousel is shown in FIG. 2a.

Figure 3:
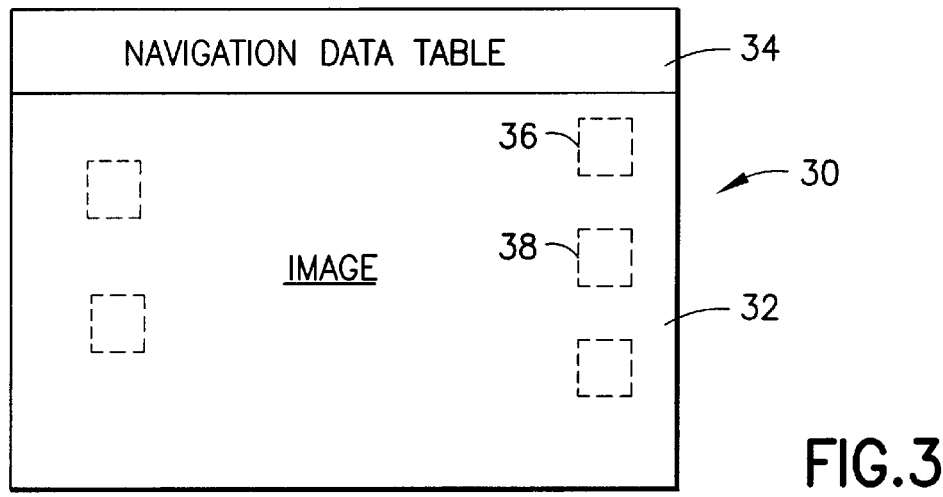
FIG. 3 illustrates a schematic representation of a frame which includes image data and a navigation data table.
Figure 4:
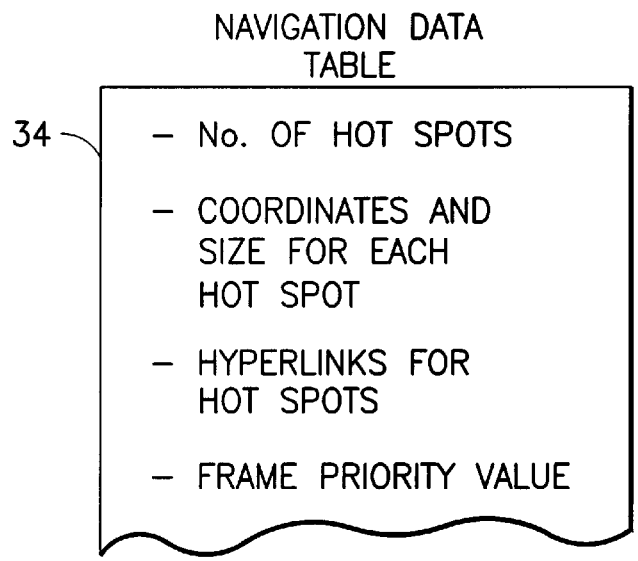
FIG. 4 is a schematic representation of a navigation data table that is included with each frame output by a head end of FIG. 1.

As shown in FIG. 3, each image frame in a carousel (e.g. frame 30 in FIG. 3), comprises a first data portion from which an image 32 can be constructed and displayed on a T.V. screen. A second portion comprises a navigation data table 34 whose contents are detailed in FIG. 4.

Each image 32 may be provided with one or more "hot spots" 36, 38, etc. which, upon selection by a user, cause a sub-procedure to be activated in set-top box 18 to change the displayed image in accordance with an indication at the hot spot. Thus, upon selection of a hot spot (e.g. by highlighting through use of a cursor), an image is accessed and displayed, either from the same carousel (of which image 32 is a part), or from another carousel.

To accomplish this function, navigation data table 34 (see FIG. 4) is provided with a number of entries: a number of hot spots in the displayed image; the location of each hot spot in the displayed image; rectangle corners for each hot spot; and hyperlink data to any other data/video/audio sources associated with a hot spot. Upon a user's selection of a hot spot, associated hyperlink data is accessed from navigation data table 34 and is used by set-top box 18 to find and display a further image (for instance) that is referred to by the hot spot.

It is preferred that head end server 14 configure each carousel in a standard MPEG-2 digital format for which set-top boxes are available in the market place. Thus, head end server 14 first packetizes the individual carousels and then wraps the packetized carousel image frames into an MPEG-2 transport stream. This is accomplished, after packetizing, by wrapping the necessary MPEG-2 header data and transport stream header structures around the data packets. Thereafter, the MPEG-2 transport stream is multiplexed by transmitter 16 and is output as a digital video broadcast. Except for size and content, the digital video broadcast data stream is indistinguishable from transport streams carrying video content and is treated in a similar fashion.

It is preferred that each carousel data stream not contain more than 100–200 separate image frames and cyclically repeat on approximately a 5-second cycle. In such manner, each directory frame 24 of a carousel becomes available every five seconds, thereby reducing the latency that occurs after a new frame choice has been made by the user. To minimize the access latency period to any frame in concurrently received carousels, the carousels may be distributed across multiple television channels, with each channel handling, for instance, 5–10 interleaved carousels.

Figure 5:
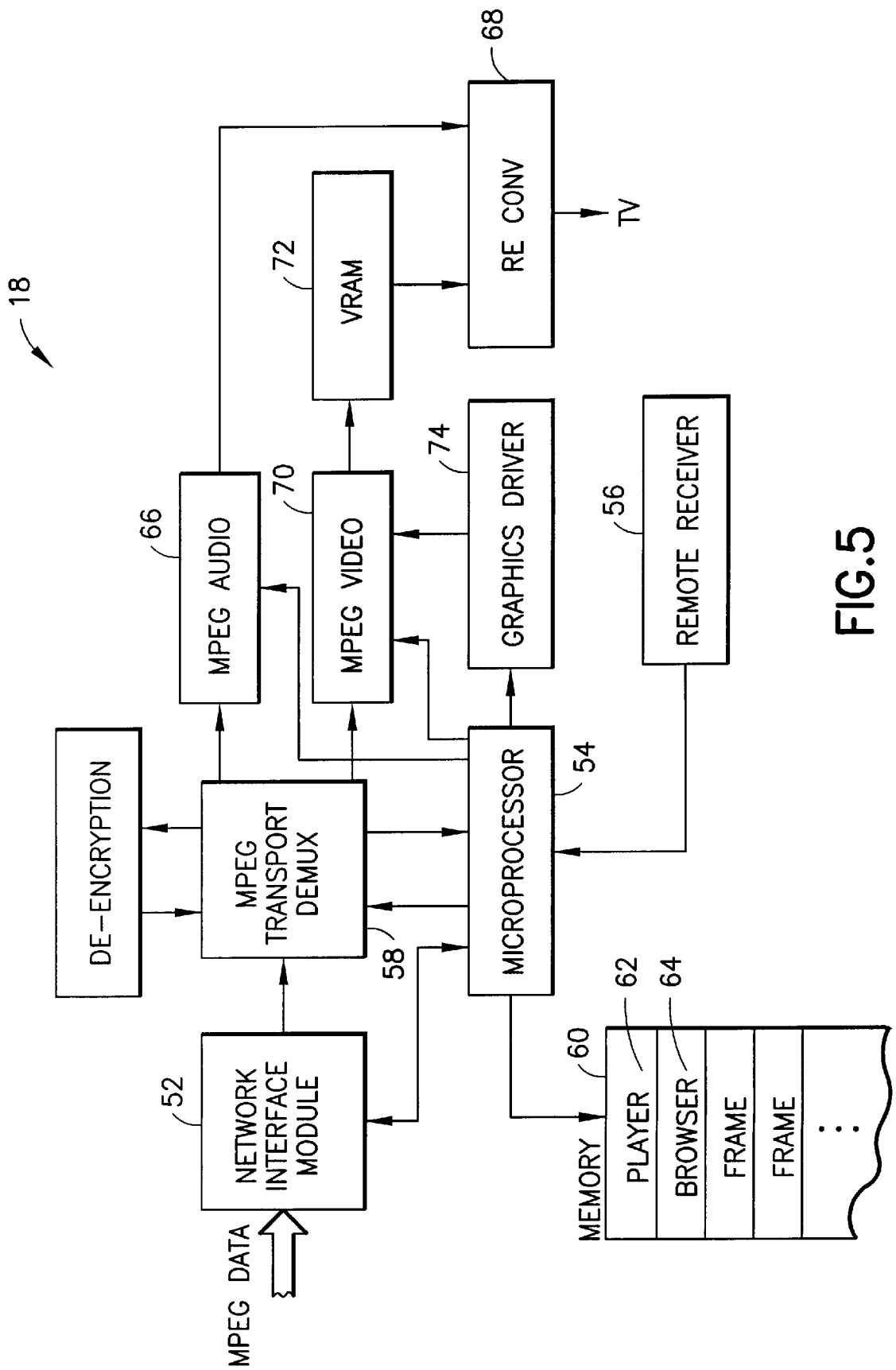
FIG. 5 is a block diagram of a set-top box employed at the receiver facility of FIG. 1.

FIG. 5 is a block diagram of a representative set-top box 18 which is adapted to perform the invention hereof. In the main, set-top box 18 is conventional in construction and is able to handle MPEG-2 transport streams and to provide a video output (RF or otherwise) to an attached television receiver. Incoming MPEG-2 data streams are applied to a network interface module 52 which is selectively tunable to access an incoming RF channel. Control of network interface module 52 is derived from microprocessor 54 which, in turn, receives user input commands via remote receiver 56. Remote receiver 56 is adapted to receive user input commands from a user-held remote transmitter.

The output from network interface module 52 is a single multi-program MPEG-2 transport stream, including multiple interleaved frames of plural carousels. It is to be understood that the input to MPEG transport demultiplexer 58 can also be standard video signals, audio signals or other data which has been segmented into the MPEG-2 format. MPEG transport demultiplexer 58 operates in response to an input from microprocessor 54 to access a desired signal stream. Microprocessor 54 accesses a directory of an addressed carousel which, in turn, indicates where a particularly desired frame resides in the addressed carousel. In the absence of any input selection by a user, microprocessor 54 causes a root frame 26 (see FIG. 2) to be accessed and decoded so that it can be shown as a default image on the associated television receiver.

Microprocessor 54 operates in conjunction with memory 60 which includes a player procedure 62 and a browser procedure 64. Player procedure 64 is a known program (i.e., an electronic program guide) which enables microprocessor 54 to display a program schedule and to further control the remaining structures within set-top box 18 in accordance with user inputs via remote receiver 56.

Browser 64 is a procedure which enables access to each of the incoming data carousels and further controls microprocessor 54 to operate in response to user input commands to access one or more frames from an accessed carousel or carousels. Browser 64, upon activation, may also insert into a displayed image certain pre-defined "standard" hot spots for system control functions, e.g., Re-trace, Home, Go Back; etc, . . .

To further reduce the latency between a user's selection of a frame and its display, memory 60 may be provided with capacity to store plural higher priority frames so as to render each thereof substantially immediately available upon user selection.

MPEG transport demultiplexer 58 outputs a demultiplexed digital audio signal to MPEG audio block 66 which recovers and feeds an audio signal train to an RF conversion module 68. Thereafter the recovered audio signal is fed to a TV or other receiver. In similar fashion, demultiplexed digital video data is fed to MPEG video block 70 where it is decompressed and configured for storage in a video random access memory (VRAM) 72, prior to being fed to RF converter 68. When microprocessor 54 receives an image frame, it strips off from the frame, data included in the accompanying navigation data table and feeds the image data to MPEG video block 70, where it is decompressed. Graphics driver 74 provides a graphics image to VRAM 72 which enables the superimposition thereinto of a graphical program listing or other graphics image.

Set-top box 18 is controlled by player procedure 62 and microprocessor 54 to initially output, via RF converter 68, an electronic program guide which appears on the television receiver as a selection of program choices. When the user actuates the remote transmitter to signal a program selection, remote receiver 56 feeds the remote signal to microprocessor 54. In response, microprocessor 54 alters the tuning of network interface module 52 to receive a selected channel.

In the event the user selects the channel carrying carousel data, network interface module 52 is controlled to tune to the carousel data channel, and also causes browser procedure 64 to be loaded from the incoming data stream. As input data is demultiplexed by demultiplexer 58, the carousel or carousels are fed to microprocessor 54. A header portion of a directory frame 24 of an initial carousel is eventually (i.e., upon arrival) recognized. If the user has not yet chosen a particular frame to be displayed, browser procedure 64 selects root frame 26 of the initial selected carousel to be passed to the connected television receiver for display.

At the same time, navigation data table 34 associated with root frame 26 is parsed and the hot spot data is readied so as to be able to respond to a user selection of a hot spot on the root frame. In addition, browser procedure 64 inserts standard hot spots for system control functions. Each hot spot may be illustrated or outlined on the displayed frame image so as to enable the user to know where specific selections can be made.

Upon selection by a user of a hot spot, the associated navigation data table 34 indicates what particular action is to occur upon such a selection. For instance, if the hot spot indicates a link is to be made to another frame in the same carousel, browser procedure 64 causes microprocessor 54 to await the demultiplexing of the particularly addressed frame from MPEG transport demultiplexer 58. When the addressed frame arrives, it is fed to MPEG video block 70, decompressed and buffered into VRAM 72. Thereafter it is fed, via RF converter 68, to the television receiver for display. Note that most set-top boxes have limited VRAM memory so they are only able to store a single image frame at a time. If however the set-top box is provided with sufficient buffer memory, additional frames can be acquired from the data string and buffered, using an anticipatory caching procedure, thus reducing the latency time between successively addressed frames.

If the selected hot spot indicates a frame in another carousel, the operation is identical to that described above, so long as the other carousel is resident on the same input data stream frequency band. If the carousel is not present in the currently incoming data stream to which network interface module 52 is tuned, network interface module 52 is retuned to the frequency band which carries the addressed carousel (and frame).

Accordingly, from the user's standpoint, the system is interactive and enables jumps to be made from frame-to-frame in a single carousel or from frame-to-frame in multiple carousels. Further, the system enables a jump to be made from a frame in a carousel to another band carrying a standard video stream or a band carrying an audio stream. All of this occurs without requiring any reverse channel communication with head end 10. Further, by interspersing higher priority frames in a carousel, image selection latency time is reduced.

One application of the invention is in the education field wherein one carousel will contain multiple frames which define major sub-categories of a particular subject. Upon selecting one such frame, hot spots will be indicated thereon which identify the availability of further information regarding the subject matter contained within the frame. Each hot spot can cause access to one or more frames in other carousels containing subsidiary information related to the subject of the main frame. Further, as incident to a lesson plan, a video feed from the head end server can be interspersed between frame image displays, all under the control of the user at the receiving end.

It is thus apparent that the invention enables multiple levels of information to be accessed without requiring reverse channel communication to the head end. Further, the invention is compatible with present digital video broadcast hardware and programming and requires no alteration to in-place standards and equipment.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

We claim:

1. A presentation system for receiving a plurality of series of digital data segments from a server source, each one of said series of digital data segments repetitively transmitted from said server source to said system on a cyclic basis, a respective digital data segment including a first data portion from which an image can be constructed and a second data portion including information related to said image and further including a priority value which defines a priority of said respective digital data segment in relation to priorities of other digital data segments in a series of digital data segments containing said respective digital data segment and said other digital data segment and, if required, information which links an active area on said image to another data source, said system comprising:

interface means for receiving said plurality of series of digital data segments;

switch means coupled to said interface means for selecting at least one of said series of digital data segments;

memory for storing plural digital data segments;

display means for displaying an image constructed from a first data portion of a data segment included in said at least one of said series of digital data segments;

processor means for examining a priority value of each received digital data segment and for storing in said memory those digital data segments which have a higher assigned priority value, to render those digital data segments more immediately available for user selection than digital data segments having lower assigned priority values, said processor means further responsive to a user selection of an active area of said image that is displayed by said display means to employ information from a second data portion associated with said image to operate said switch means to access said another data source, without communication with said server source.

2. The presentation system as recited in claim 1, wherein said another data source is a data segment.

3. The presentation system as recited in claim 2, wherein said another data segment comprises a part of another one of said plurality of series of digital data segments and said switch means is operated to access said another one of said plurality of series of digital data segments and said another data segment therein.

4. The presentation system as recited in claim 2, wherein said another data segment comprises a part of said plurality of series of digital data segments including said image whose active area was selected.

5. The presentation system as recited in claim 1, wherein said another data source is a video presentation.

6. The presentation system as recited in claim 1, wherein said another data source is an audio presentation.

7. The presentation system as recited in claim 1, wherein each said series of digital data segments includes at least one digital data segment with index information to other digital data segments in said series of digital data segments.

8. The presentation system as recited in claim 1, wherein at least one of said series of digital data segments includes plural copies of a digital data segment with index information to other digital data segments in said series of digital data segments, said plural copies positioned in said series of digital data segments so as to reduce a waiting time for said index information as said series of digital data segments is cycled.

9. The presentation system as recited in claim 1, wherein said plurality of series of digital data segments are received in a data stream that is organized to present digital data segments from said plurality of said series of digital data segments in a time division multiple access fashion over a single radio frequency channel.

10. The presentation system as recited in claim 1, wherein said plurality of series of digital data segments are received in plural data streams over plural radio frequency channels and said interface means is responsive to said user selection to tune to a radio frequency channel which includes said another data segment.

11. A method for operating a presentation system to present a plurality of series of digital data segments received from a server source, each digital data segment including a first data portion from which a single image can be constructed and a second data portion including information related to said single image and further including, if required, information which links an active area on said image to another data source, said method comprising the steps of:

transmitting each one of said series of digital data segments on a repetitive, cyclic basis, each series of digital data segments including a plurality of sequentially presented different digital data segments and a selected digital data segment which is repeated plural times in a series during each cycle;

receiving said plurality of series of digital data segments;

accessing one of said series of digital data segments, said accessing requiring less waiting time to access said selected digital data segment as a result of said selected digital data segment being repeated plural times during each cycle;

displaying an image constructed from a first data portion of a data segment included in said at least one of said series of digital data segments; and responding to a user selection of an active area of said image that is displayed by employing information from a second data portion associated with said image to access said another data source without communication with said server source.

12. The method as recited in claim 11, wherein said another data source is a data segment.

13. The method as recited in claim 12, wherein said another data segment comprises a part of another one of said plurality of series of digital data segments and said selecting step accesses said another one of said plurality of series of digital data segments and said another data segment therein.

14. The method as recited in claim 12, wherein said another data segment comprises a part of said plurality of series of digital data segments including said image whose active area was selected.

15. The method as recited in claim 11, wherein said another data source is a video presentation.

16. The method as recited in claim 11, wherein said another data source is an audio presentation.

17. The method as recited in claim 11, wherein said plurality of series of digital data segments are received in plural data streams over plural radio frequency channels and said selecting step is responsive to said user selection to tune to a radio frequency channel which includes said another data segment.

18. The method as recited in claim 11, wherein said selected digital data segment includes index information to other digital data segments in said series of digital data segments, said plural copies positioned in said series of digital data segments so as to reduce a waiting time for said index information as said series of digital data segments is cycled.

* * * * *